United States Patent
Meylan et al.

(10) Patent No.: US 9,571,952 B2
(45) Date of Patent: Feb. 14, 2017

(54) OFFLOADING OF DATA TO WIRELESS LOCAL AREA NETWORK

(75) Inventors: Arnaud Meylan, San Diego, CA (US); Tejash Rajnikant Shah, San Diego, CA (US); Jay Kumar Sundararajan, San Diego, CA (US)

(73) Assignee: QUALCOMM Incorporatd, San Diego, CA (US)

( * ) Notice: Subject to any disclaimer, the term of this patent is extended or adjusted under 35 U.S.C. 154(b) by 60 days.

(21) Appl. No.: 13/371,244

(22) Filed: Feb. 10, 2012

(65) Prior Publication Data

US 2012/0270538 A1 Oct. 25, 2012

Related U.S. Application Data

(60) Provisional application No. 61/478,123, filed on Apr. 22, 2011.

(51) Int. Cl.
*H04W 88/06* (2009.01)
*H04W 4/00* (2009.01)
(Continued)

(52) U.S. Cl.
CPC ............ *H04W 4/003* (2013.01); *H04L 69/162* (2013.01); *H04L 69/32* (2013.01); *H04W 4/20* (2013.01);
(Continued)

(58) Field of Classification Search
CPC ...... H04W 88/02; H04W 92/02; H04W 76/02; H04W 76/025; H04W 76/026
See application file for complete search history.

(56) References Cited

U.S. PATENT DOCUMENTS 5,737,687 A 4/1998 Martin et al.
6,115,744 A 9/2000 Robins et al.
(Continued)

FOREIGN PATENT DOCUMENTS

CN 101383690 A 3/2009
CN 101931685 A 12/2010
(Continued)

OTHER PUBLICATIONS

Ananthanarayaran G., et al ., "A New Communications API", Electrical Engineering and Computer SciencesUniversity of California at Berkeley, May 25, 2009 (May 25, 2009), pp. 1-14, XP002676108, Retrieved from the Internet: URL:http://www.eecs.berkeley.edu/Pubs/Tech Rpts/2009/EECS-2009-84.pdf [retrieved on May 16, 2012].
(Continued)

*Primary Examiner* — Mazda Sabouri
(74) *Attorney, Agent, or Firm* — Kevin M. Donnelly

(57) ABSTRACT

Methods, systems, and devices are described for intercepting socket calls from applications installed on a mobile device while a first wireless interface is active. The first wireless interface is a cellular interface. Upon determining to release the intercepted socket calls to the socket layer, a second wireless interface is activated. The second wireless interface is a Wireless Local Area Network (WLAN) interface. The sockets calls are released to the socket layer and transmitted using the activated second wireless interface. Upon substantially completing the socket calls, the second wireless interface is deactivated. The intercepting of the socket calls and the activation of the second wireless interface occurs while the mobile device is in an idle mode.

27 Claims, 10 Drawing Sheets

(51) Int. Cl.

| | | |
|---|---|---|
| *H04L 29/06* | (2006.01) | |
| *H04L 29/08* | (2006.01) | |
| *H04W 48/16* | (2009.01) | |
| *H04W 48/18* | (2009.01) | |
| *H04W 68/12* | (2009.01) | |
| *H04W 76/02* | (2009.01) | |
| *H04W 80/06* | (2009.01) | |
| *H04W 80/08* | (2009.01) | |
| *H04W 4/20* | (2009.01) | |
| *H04W 76/04* | (2009.01) | |
| *H04W 80/00* | (2009.01) | |
| *H04W 84/12* | (2009.01) | |
| *H04W 88/02* | (2009.01) | |
| *H04W 52/02* | (2009.01) | |
| *H04W 84/18* | (2009.01) | |

(52) U.S. Cl.
CPC ............ *H04W 48/16* (2013.01); *H04W 48/18* (2013.01); *H04W 68/12* (2013.01); *H04W 76/022* (2013.01); *H04W 80/06* (2013.01); *H04W 80/08* (2013.01); *H04W 88/06* (2013.01); *H04W 52/0225* (2013.01); *H04W 76/04* (2013.01); *H04W 80/00* (2013.01); *H04W 84/12* (2013.01); *H04W 84/18* (2013.01); *H04W 88/02* (2013.01)

(56) References Cited

U.S. PATENT DOCUMENTS

| | | | |
|---|---|---|---|
| 6,122,514 A | 9/2000 | Spaur et al. | |
| 6,181,919 B1 | 1/2001 | Ozluturk | |
| 6,198,911 B1 | 3/2001 | Lea et al. | |
| 7,107,063 B1 | 9/2006 | Bates et al. | |
| 7,251,490 B2 | 7/2007 | Rimoni | |
| 7,486,954 B2 | 2/2009 | Lee et al. | |
| 7,664,838 B2 | 2/2010 | Monga et al. | |
| 7,769,887 B1* | 8/2010 | Bhattacharyya et al. | 709/238 |
| 7,860,469 B2 | 12/2010 | Mohanty et al. | |
| 2002/0001292 A1 | 1/2002 | Miyamoto | |
| 2002/0052790 A1 | 5/2002 | Tomishima | |
| 2002/0095524 A1 | 7/2002 | Sanghvi et al. | |
| 2002/0123356 A1 | 9/2002 | Michaud et al. | |
| 2003/0134632 A1 | 7/2003 | Loughran | |
| 2003/0153317 A1* | 8/2003 | Friman et al. | 455/446 |
| 2004/0009751 A1 | 1/2004 | Michaelis et al. | |
| 2004/0097254 A1 | 5/2004 | Laroia et al. | |
| 2004/0158729 A1* | 8/2004 | Szor | 713/200 |
| 2004/0172481 A1 | 9/2004 | Engstrom | |
| 2004/0192391 A1 | 9/2004 | Nagai | |
| 2004/0264396 A1 | 12/2004 | Ginzburg et al. | |
| 2005/0149376 A1* | 7/2005 | Guyan et al. | 705/9 |
| 2006/0155856 A1 | 7/2006 | Nakashima et al. | |
| 2006/0217116 A1 | 9/2006 | Cassett et al. | |
| 2006/0221953 A1 | 10/2006 | Basso et al. | |
| 2007/0174469 A1 | 7/2007 | Andress et al. | |
| 2007/0178876 A1 | 8/2007 | Yaqub et al. | |
| 2007/0201369 A1 | 8/2007 | Pedersen et al. | |
| 2007/0245171 A1* | 10/2007 | Ohly et al. | 714/42 |
| 2007/0286222 A1 | 12/2007 | Balasubramanian | |
| 2007/0294410 A1 | 12/2007 | Pandya et al. | |
| 2008/0019339 A1 | 1/2008 | Raju et al. | |
| 2008/0183857 A1 | 7/2008 | Barfield et al. | |
| 2008/0234012 A1 | 9/2008 | Liu et al. | |
| 2009/0005127 A1 | 1/2009 | Frenger et al. | |
| 2009/0022095 A1 | 1/2009 | Spaur et al. | |
| 2009/0049518 A1 | 2/2009 | Roman et al. | |
| 2009/0183186 A1 | 7/2009 | Murtagh | |
| 2009/0318124 A1* | 12/2009 | Haughn | 455/418 |
| 2009/0325512 A1 | 12/2009 | Granlund et al. | |
| 2010/0045422 A1 | 2/2010 | Teng et al. | |
| 2010/0142477 A1 | 6/2010 | Yokota | |
| 2010/0144332 A1 | 6/2010 | Savoor | |
| 2010/0231383 A1 | 9/2010 | Levine et al. | |
| 2010/0279745 A1 | 11/2010 | Westcott et al. | |
| 2010/0285776 A1 | 11/2010 | De | |
| 2010/0287281 A1 | 11/2010 | Tirpak | |
| 2010/0322124 A1 | 12/2010 | Luoma et al. | |
| 2011/0003592 A1 | 1/2011 | Matsumoto | |
| 2011/0019557 A1 | 1/2011 | Hassan et al. | |
| 2011/0028085 A1* | 2/2011 | Waung et al. | 455/7 |
| 2011/0054879 A1 | 3/2011 | Bogsanyl et al. | |
| 2011/0149797 A1* | 6/2011 | Taaghol | H04L 12/5692 370/254 |
| 2011/0182220 A1 | 7/2011 | Black et al. | |
| 2011/0185202 A1 | 7/2011 | Black et al. | |
| 2011/0188394 A1 | 8/2011 | Seo | |
| 2011/0201285 A1 | 8/2011 | Giaretta et al. | |
| 2012/0020266 A1 | 1/2012 | Sun et al. | |
| 2012/0129503 A1 | 5/2012 | Lindeman et al. | |
| 2012/0134361 A1 | 5/2012 | Wong et al. | |
| 2012/0185577 A1 | 7/2012 | Giaretta et al. | |
| 2012/0214527 A1 | 8/2012 | Meylan et al. | |
| 2012/0236772 A1 | 9/2012 | Kondratiev | |
| 2012/0257512 A1 | 10/2012 | Lim | |
| 2013/0052965 A1 | 2/2013 | Meylan et al. | |
| 2013/0053013 A1 | 2/2013 | Giaretta et al. | |
| 2013/0165181 A1 | 6/2013 | Hasegawa | |
| 2013/0217331 A1 | 8/2013 | Manente | |
| 2013/0217357 A1 | 8/2013 | Menezes et al. | |
| 2013/0225100 A1 | 8/2013 | Chen et al. | |
| 2014/0286256 A1 | 9/2014 | Chowdhury et al. | |

FOREIGN PATENT DOCUMENTS

| | | |
|---|---|---|
| CN | 102186167 A | 9/2011 |
| EP | 2019517 A1 | 1/2009 |
| JP | 2001339465 A | 12/2001 |
| JP | 2002091841 A | 3/2002 |
| JP | 2004297218 A | 10/2004 |
| JP | 2008048072 A | 2/2008 |
| JP | 2008072568 A | 3/2008 |
| JP | 2008187377 A | 8/2008 |
| JP | 2009021966 A | 1/2009 |
| JP | 2009182443 A | 8/2009 |
| JP | 2009540687 A | 11/2009 |
| JP | 2010074818 A | 4/2010 |
| JP | 2010183414 A | 8/2010 |
| JP | 2011530860 A | 12/2011 |
| JP | 2012529807 A | 11/2012 |
| WO | 03036491 A1 | 5/2003 |
| WO | 2007146549 A2 | 12/2007 |
| WO | 2009096410 A1 | 8/2009 |
| WO | 2010016849 A1 | 2/2010 |
| WO | 2011023096 A1 | 3/2011 |
| WO | 2011146831 A1 | 11/2011 |

OTHER PUBLICATIONS

Andrea Passarella: "Power Management Policies for Mobile Computing", Feb. 1, 2005 (Feb. 1, 2005), pp. 1-151, XP055019616, Retrieved from the Internet: URL:http://cnd.iit.cnr.it/andrea/docs/passarella_phd_thesis.pdf [retrieved-on Feb. 16, 2012] * chapter 5.3, 5.3.1.

Chen L., et al., "QoS aware power efficiency in IEEE 802.11 LAN", Consumer Communications and Networking Conference, 2005. CCNC. 2005 Second IEEE, IEEE, Piscataway, NJ, USA, Jan. 3, 2005 (Jan. 3, 2005), pp. 85-90, XP010787616, DOI: 10.1109/CCNC.2005.1405149, ISBN: 978-0-7803-8784-3 * chapter III C * figures 3-2.

International Search Report and Written Opinion—PCT/US2012/034582—ISA/EPO—Jul. 30, 2012.

Kravets R et al: "Application-Driven Power Management for Mobile Communication" Wireless Networks, ACM, New York, NY, US, vol. 6, No. 4, Sep. 2000 (Sep. 2000), pp. 263-277, XP001036334 ISSN: 1022-0038.

Liu China MOB1 Le Yuri Ismai Lov Ericsson Z Cao China Mobile D: "Socket API Extension for MIF Host; draft-liu-mif-api-extension-03.txt", Socket API Extension for MI F Host; Draft-LIU-MIF-

(56) References Cited

OTHER PUBLICATIONS

API-Extension-03.txt, Internet Engineering Task Force, IETF; Standardworkingdraft, Internet Society (ISOC) 4, Rue Des Falaises CH—1205 Geneva, Switzerland, No. 3, Oct. 25, 2010 (Oct. 25, 2010), pp. 1-8, XP015072273, [retrieved on Oct. 25, 2010] abstract * chapters 3-7 * figure 1.

Liu China Mobile Yuri Ismailov Ericsson Z Cao China Mobile D: "Socket API Extension for MIF Host; draft-liu-mif-api-extension-04.txt", Socket API Extension for MIF Host; Draft-LIU-MIF-API-Extension-04.txt, Internet Engineering Task Force, IETF; Standardworki Ngdraft, Internet Society (ISOC) 4, Rue Des Falaises CH—1205 Geneva, Switzerland, No. 4, Mar. 15, 2011 (Mar. 15, 2011), pp. 1-9, XP015074974, [ retrieved on Mar. 15, 2011] abstract *chapter 3-5 * figure 1.

Liu H., et al: "TailTheft: Leveraging the Wasted Time for Saving Energy in Cellular Communications", MobiArch '11 Proceedings of the sixth international workshop on MobiArch Jun. 28, 2011 (Jun. 28, 2011), pp. 31-36, XP002676107, ISBN: 978-1-4503-0740-6 Retrieved from the Internet: URL:http://delivery.acm.org/10.1145/2000000/1999925/p31-liu.pdfΔip=145.64.134.245&acc=ACTIVE%20SERVICE&CFID=103451177&CFTOKEN=63558822&_acm_=1337160633_c5b6dc53c6b1c9 77ac53b9dfb0180831 [retrieved on May 16, 2012].

Hare, J., Agrawal, D., Mishra, A., Banerjee, S. et al. (Jan. 2011). A network-assisted system for energy efficiency in mobile devices. *2011 Third International Conference on Communication Systems and Networks (COMSNETS)*, pp. 1-10. DOI: 10.1109/COMSNETS.2011.

* cited by examiner

OFFLOADING OF DATA TO WIRELESS LOCAL AREA NETWORK

CROSS REFERENCES

The present application for patent claims priority benefit of U.S. patent application Ser. No. 61/478,123, entitled "POWER EFFICIENT OFFLOADING OF DATA IN STANDBY TO WIRELESS LOCAL AREA NETWORK (WLAN)" by Arnaud Meylan, filed Apr. 22, 2011, assigned to the assignee hereof, and expressly incorporated by reference herein.

BACKGROUND

Applications or device applets are now available that operate to provide a wide range of add-on services and features to wireless devices. For example, it is now possible for wireless devices to download and launch device applets to perform value added functions such as shopping, searching, position location, driving navigation, or an array of other functions. Thus, the use of device applets may increase the functionality and usability of wireless devices and offers device users features and convenience not originally available on the devices themselves.

A wireless device may interface with one or more communication networks. For example, the wireless device may include a variety of radios providing communications using Cellular, WiFi, Bluetooth, or other types of radio access technologies. Accordingly, applications executing on the wireless device may interface with a radio to establish a communications channel, and the channel may be used by the applications to communicate with the appropriate network.

Applications may continue to interface with radios on the wireless device to establish communication channels even when the device is in an idle mode. A cellular interface may provide a low power consumption rate while the device is in an idle state, while a WiFi interface may allow the device to transport data at a lower power consumption rate than the cellular interface. With an increasing number of applications installed on a device, cellular data networks may become overloaded by network signaling associated with the setup of communication channels.

SUMMARY

Methods, systems, and devices are described for intercepting socket calls from applications installed on a mobile device. In some embodiments, a first wireless interface (e.g., a cellular interface) is active. Upon determining to release the intercepted socket calls to the socket layer, a second wireless interface (e.g., Wireless Local Area Network (WLAN) interface) is activated. The sockets calls are released to the socket layer and transmitted using the activated second wireless interface. Upon substantially completing the socket calls, the second wireless interface is deactivated. The intercepting of the socket calls and the activation of the second wireless interface occurs while the mobile device is in an idle mode.

In one embodiment, activating the second wireless interface may include scanning for an available second wireless network. The second network may be different than a first wireless network. The first wireless network may be associated with the first wireless interface. Upon detecting an available second wireless network, the second wireless interface may be activated.

In one example, the second wireless interface may be deactivated upon detecting a triggering event. Detecting the triggering event may include determining that the at least one socket call has been substantially performed. In one configuration, detecting the triggering event may include determining that a timer has substantially expired.

In one embodiment, the first wireless interface may be maintained in an activated state during a period when the second wireless interface is in an activated state. The first wireless interface may also be maintained in an activated state during a period when the second wireless interface is in a deactivated state.

In one configuration, the first wireless interface may be deactivated, substantially upon determining that the second wireless interface is activated. The first wireless interface may be reactivated, substantially upon determining the second wireless interface is deactivated.

In one example, a notification pertaining to the second wireless interface becoming active may be disabled. For example, one or more applications with a persistent Transmission Control Protocol (TCP) connection via the first wireless interface may be identified. The one or more applications may be prevented from receiving a notification pertaining to the second wireless interface becoming active. Preventing the one or more applications from receiving the notification may include intercepting the notification pertaining to the second wireless interface becoming active, and discarding the notification. Preventing the one or more applications from receiving the notification may also include discarding traffic directed to the second wireless interface that originates from the one or more applications.

In one embodiment, determining to release the at least one intercepted socket call to the socket layer may include detecting the occurrence of a releasing triggering event. The releasing triggering event may include at least one of an expiry of a timer, a status change of a display, a status change of a microphone, a status change of a speaker, a status change of a global positioning system (GPS) sensor of the mobile device, an indication that a universal serial bus port is in use, an indication that an audio equipment is connected to the mobile device, an indication that a video equipment is connected to the mobile device, a receipt of a maximum number of socket calls, or an indication that a Wireless Local Area Network (WLAN) is complete.

In one example, determining to release the at least one intercepted socket call to the socket layer may include identifying an application that originated the at least one socket call as a critical application. Determining to release the at least one intercepted socket call to the socket layer may also include determining the at least one intercepted socket call possesses a delay tolerance that is below a tolerance threshold.

In one configuration, instructions for a wrapper may be executed. The executed wrapper may perform the intercepting of the at least one socket call. The wrapper may be located between an application layer and a socket layer of the operating system of the mobile device. In one embodiment, the operations performed by the wrapper may be embedded in the socket layer.

A mobile device configured for wireless communication is also described. The device may include a processor and memory in electronic communication with the processor. The memory may include an operating system. The processor may include an application connectivity engine. The engine may be configured to execute instructions to intercept at least one socket call from reaching a socket layer at the mobile device while a first wireless interface is active. The engine may be further configured to execute instructions to activate, substantially upon determining to release the at least one intercepted socket call to the socket layer, a second wireless interface. In addition, the engine may be configured to execute instructions to release the at least one intercepted socket call to the socket layer and transmit the released socket call using the activated second wireless interface.

An apparatus configured to manage socket calls from applications on a mobile device is also described. The apparatus includes means for intercepting at least one socket call from reaching a socket layer at a mobile device while a first wireless interface is active. The apparatus may further include means for activating, substantially upon determining to release the at least one intercepted socket call to the socket layer, a second wireless interface. The apparatus may further include means for releasing the at least one intercepted socket call to the socket layer and means for transmitting the released socket call using the activated second wireless interface.

A computer program product configured to manage socket calls from applications on a mobile device is also described. The product may include a non-transitory computer-readable medium. The medium may include code to intercept at least one socket call from reaching a socket layer at a mobile device while a first wireless interface is active. The medium may further include code to activate, substantially upon determining to release the at least one intercepted socket call to the socket layer, a second wireless interface. In addition, the medium may also include code to release the at least one intercepted socket call to the socket layer and code to transmit the released socket call using the activated second wireless interface.

The foregoing has outlined rather broadly the features and technical aspects of examples according to disclosure. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
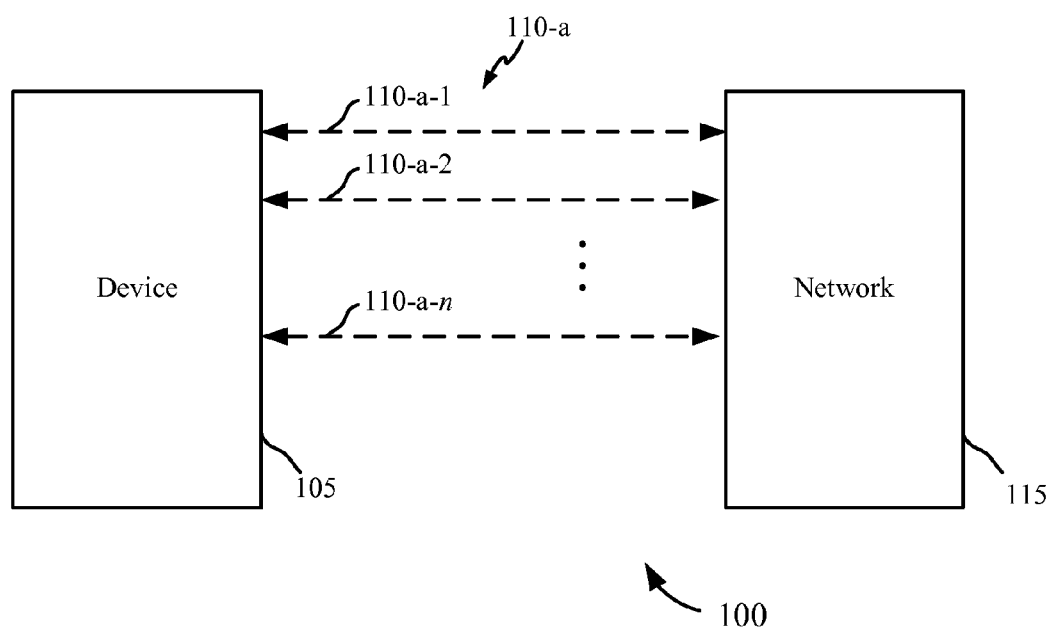
FIG. 1 shows a block diagram of a network environment.

Methods, systems, and devices are described to intercept requests issued from applications installed on a mobile device while a first wireless interface is active. An operating system (OS) executing on the mobile device may present the first interface to the applications as being active. An active interface may indicate to the applications that a radio connection is available to be established over a first network.

The intercepted requests may be system calls or sockets calls to establish communication channels for the mobile device. The terms "requests", "system calls", and "socket calls" may be used interchangeably herein. The requests may be captured and held from reaching the OS executing on the mobile device. For example, the requests may be held from reaching a Transmission Control Protocol/Internet Protocol (TCP/IP) stack of the OS.

In mobile devices such as smartphones, personal digital assistants, etc., software applications may continue to operate even though the user is not actively using the device (e.g., the device is in an idle mode). A mobile device may be in idle mode when certain inputs of the device are not operational or are in a sleep state. The device may be considered to be in a background mode (i.e., an idle mode) when a user is not using the device. For example, when audio inputs (such as a microphone) are off, the device may be in an idle mode. In addition, when visual inputs (such as a display of the device) are off, the device may be determined to be in an idle mode. Additional inputs may be used to determine whether or not the mobile device is in an idle mode, as will be described below.

Applications such as social networking applications, email or other communication applications, data feeds, etc. (popular examples include Facebook®, Gmail®, Twitter®, etc.) may continue to send and receive data even though a user is not using the device. Even under an inactivity mode of operation (e.g., an idle mode), power consumption and spikes in activity may occur from applications that continue to operate even when the device is ostensibly not in use. The activity by these applications may utilize communication resources such as provided by an external network. This may result in an undesired increase is signaling across the external network that may negatively affect the capabilities of the network.

Current operating systems installed on mobile devices may present the applications with an "always-on" cellular radio interface. An "always-on" interface may represent to the applications that they may request the establishment of a radio connection (e.g., a communication channel) on a cellular data network at any time, even when the device is in idle mode. The "always-on" interface may cause mobile devices to overload the cellular data network with frequent radio connections triggered asynchronously by the set of applications running on the device.

While a device is in an idle mode, a user may tolerate a delay in the update of the various applications' data. Accordingly, socket calls from various applications may be intercepted and held from reaching the OS, or a socket layer within the OS. The socket calls may then be released to the OS (or the socket layer within the OS) in a synchronous manner. The synchronous release of socket calls may allow for an improved utilization of radio connections since several applications may synchronously update their information.

A complementary approach addressed by the present systems and methods may include using a wireless local area network (WLAN) to transmit/receive data to/from the mobile device instead of a cellular radio to transport data updates for the applications. In some examples, applications transmit/receive data across the cellular network via a cellular interface presented by the OS. In accordance with the present systems and methods, applications may instead transmit/receive data across the WLAN on a WLAN interface while the device is in an idle mode. The WLAN interface may be activated and presented to the applications by the OS on the mobile device.

In some embodiments, when a number of applications installed on a mobile device request access to a cellular network while the device is in an idle mode, an unnecessary amount of network signaling may occur. For example, the OS may present the cellular interface as an "always-on" interface. A first application may see the activated cellular interface and initiate a socket call which may require the establishment of a communication channel on the cellular network. After the data has been transmitted/received, the channel may be discontinued. A second application may also see the "always on" cellular interface and initiate a socket call to also establish a communication channel to transmit/receive data across the cellular network. Each time a communication channel is established, the amount of network signaling may increase so that the available bandwidth of the network may decrease. As a result, the present systems and methods may intercept requests for access to the cellular network when the device is in an idle mode. When it is determined to release the intercepted requests to the OS, a WLAN interface may be activated. The requests may be transmitted on the WLAN interface (instead of the cellular interface). When the requests have been substantially performed, the WLAN interface may be deactivated to conserve battery power of the device.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring now to FIG. 1, a block diagram illustrates an example of a wireless network environment 100. The network environment 100 may include a mobile device 105 and a communication network 115. The device 105 may communicate with the network 115 using a number of radio channels 110-*a*. For example, a control channel 110-*a*-1 may be established between the device 105 and the network 115. In addition, other types of channels 110-*a*-2 through 110-*a*-*n* may also be established. These other types of channels may include data channels, voice channels, etc.

During operation, the device 105 may execute applications which may interface with the network 115 using any of a number of radios. For example, an application may issue a request to establish communications with a host in the network 115. In one example, the requests may be a networking system call, such as a socket layer call. The request may be intended for the socket layer of an OS on the device 105. Conventional devices typically allow these types of requests to proceed directly to the OS to be processed. Upon receipt of the request, conventional devices begin network signaling processes to establish the control channel 110-*a*-1 through a data connection setup procedure. When data connection setup procedures are executed on the mobile device 105, the level of signaling across the network may increase and battery power is consumed. This may reduce the efficiency of the network 115 and the mobile device 105.

In one configuration, the device 105 may include an architecture to intercept and capture requests from reaching the OS while a first wireless interface is active. This architecture may intercept a request for network access from an application, such as a request for cellular network access. Upon intercepting the request, the architecture may hold or delay the request from reaching a TCP/IP stack of the OS. The TCP/IP stack may include communication protocols that may be built into the OS, providing the OS with a standard for transmitting data over a network. Upon substantially determining to release the requests to the OS, the architecture may activate a second wireless interface. The intercepted requests may be aggregated with other intercepted requests for network access received from additional applications. The aggregated requests may be bundled together and released to a socket layer within the OS in a synchronous manner. In one embodiment, the aggregated requests may be released to the OS in a synchronous manner. The requests may then be transmitted using the second wireless interface. In one example, the requests may be released upon the occurrence of a particular event (e.g., the mobile device becomes active). In one configuration, the architecture described above relating to the intercepting, determining, activating, and releasing may be used when the device 105 is in an idle mode.

Figure 2:
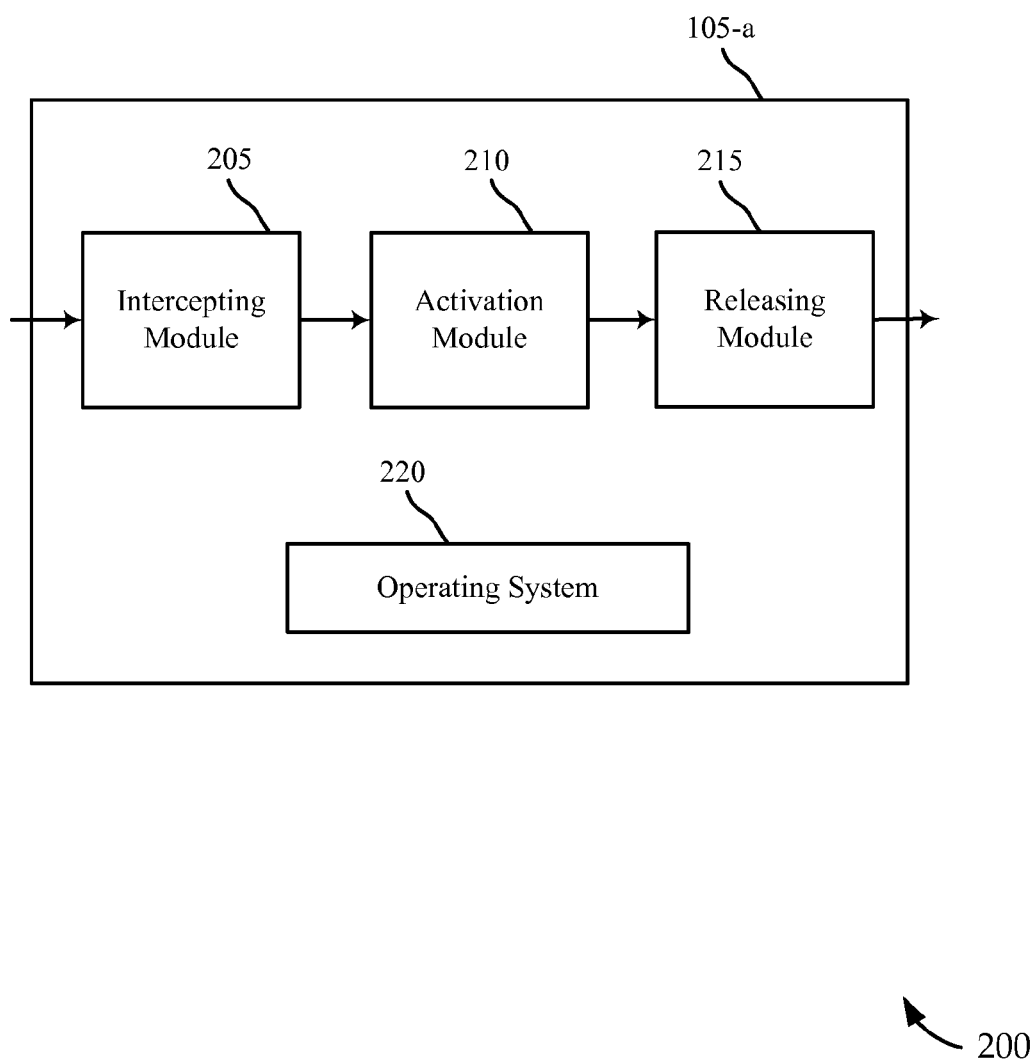
FIG. 2 shows a block diagram illustrating an architecture for a mobile device.

FIG. 2 shows one example 200 of a mobile device 105-*a*. The mobile device 105-*a* may be an example of the mobile device 105 of FIG. 1. In one configuration, the device 105-*a* may include an intercepting module 205, an activation module 210, a releasing module 215, and an OS 220. The intercepting module 205 may intercept requests from applications from reaching the OS 220. The requests may be intercepted while a first wireless interface is activated and the device 105-*a* is in an idle mode. The requests may include system access calls, such as socket calls. Examples of socket calls that may be intercepted include connect( ), send( ), sendto( ), gethostbyname( ), etc. A connect( ) socket call may initiate an attempt by the mobile device 105-a to establish a communication channel across a network, such as a TCP connection.

In one example, the activation module 210 may determine when the intercepted requests are to be released to the OS 220 or to a socket layer within the OS 220. Upon substantially determining to release the requests, the activation module 210 may activate a second wireless interface. For example, the activation module 210 may activate a WLAN interface. The release module 215 may release the requests when the WLAN interface has been activated.

The determination to release the requests may be based on one or more factors. In one embodiment, the determination to release the intercepted requests may include detecting the expiration of a timer that represents the length of time requests have been held or delayed from reaching the OS 220, or from reaching a socket layer within the OS 220. The requests may also be released upon detecting a maximum number of intercepted requests being held in a queue. In one configuration, a request may be released upon determining that a critical application issued the request to the OS 220. A critical application may be an application with little or no delay tolerance. As a result, requests originating from these applications may possess a low delay tolerance. Examples of critical applications may include, but are not limited to, child tracking applications, emergency-based applications, subscription-based applications, etc. In one configuration, requests sent from critical applications may not be held (or delayed) from reaching the OS 220, but may instead proceed directly to the socket layer of the operating system after being intercepted by the intercepting module 205. In addition, requests with a delay tolerance that is below a certain threshold may not be delayed from reaching the OS 220 after being intercepted. For example, a non-critical application may issue a request that is intercepted. Even though the application is non-critical, the particular request may not possess a delay tolerance (e.g., a critical update to the application). As a result, the request may be released immediately to the OS 220 after being intercepted.

Additional factors may be employed to determine when to release the intercepted requests and permit application connectivity to a network. For example, if there is a trigger to establish a data connection setup procedure (such as receiving a system call from a critical application, such as an emergency application that cannot be delayed), intercepted requests may be released to the OS 220 so that communications channels may be established in conjunction with the emergency application. In another example, the intercepted requests may be released to a socket layer within the OS 220. Requests may also be released if the quality of a radio channel satisfies a threshold (e.g., high signal strength, SNR, or other desirable performance metrics). Requests may be released periodically as predetermined or as selectively determined by the mobile device 105-a. Another heuristic to determine to release the requests may be when the user approaches the device (before he/she turns the screen on) in order to operate incognito. In this example, an accelerometer may detect the user grabbing the device 105-a, or a user proximity sensor may indicate the user is approaching. In another aspect, while running on batteries, requests may be determined to be released when the screen is unlocked, (e.g., after a PIN is entered correctly). In this aspect, requests may not be released when a random button is pressed (e.g., device 105-a is in a purse or pocket).

In one example, a status change of a display of the device 105-a may be a factor in the determination to release held requests. For example, the display may change from an "off" state to an "on" state. A status change of a microphone (off to on) may also be a factor in the determination to release intercepted requests. Further, another factor may include detecting a status change of a Global Positioning System (GPS) sensor. For example, the sensor may change states when it detects movement of the mobile device 105-a. Additional factors used to determine when to release intercepted requests may include an indication that a universal serial bus port is in use or an indication that an audio equipment is connected to the device 105-a. In addition, an indication that video equipment is connected to the mobile device 105-a may also serve as a determining factor to release the requests to the OS 220 of the mobile device 105-a. Further, an indication that a connection to a certain network is available may trigger the release of the requests. For example, an indication that a connection to a Wi-Fi type of network may cause the requests to be released. Similarly, an indication that a radio connection to a cellular network is already open may also trigger the release of the requests to the OS 220 of the device 105-a. In yet another aspect, requests may be released according to some combination of the above or other factors. Although the preceding description is with respect to an application programming interface (API) architecture, the concepts may equally apply in hardware, firmware, or any combination of hardware and software.

Figure 3:
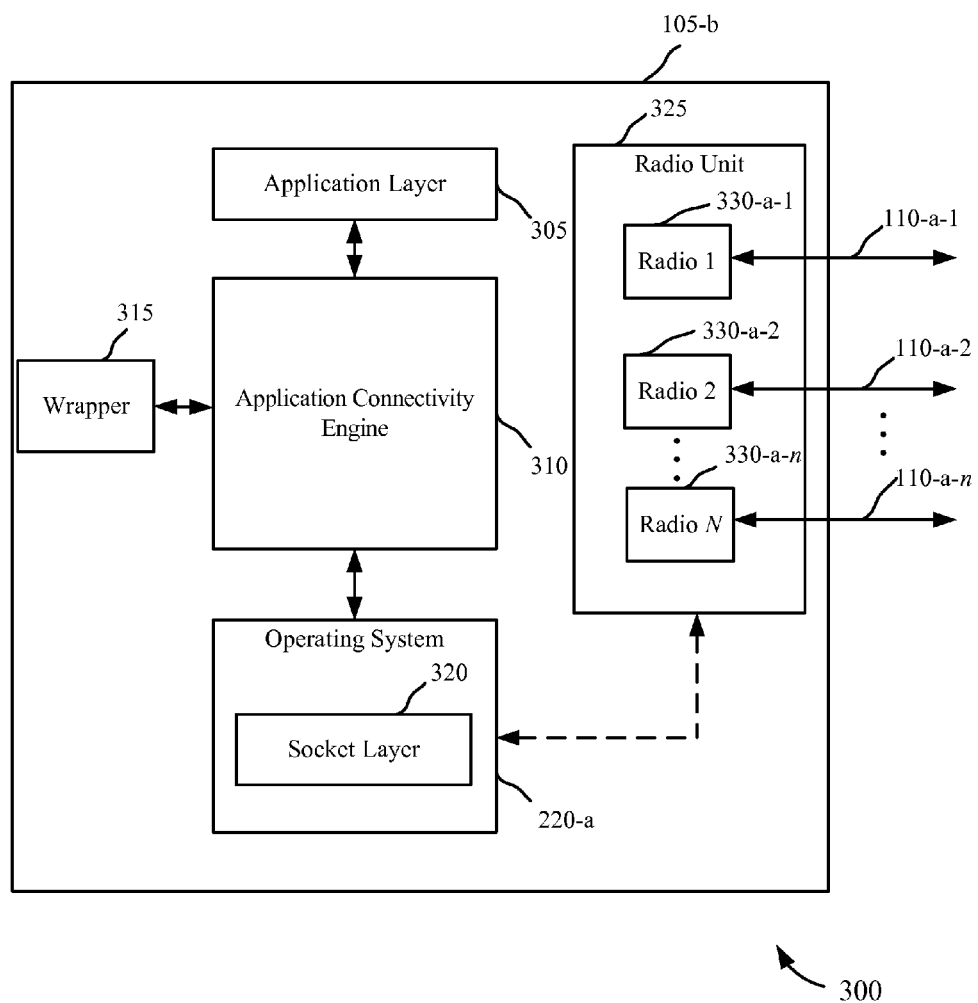
FIG. 3 shows another example of an architecture of the mobile device.

FIG. 3 shows one example of an architecture 300 of a mobile device 105-b, which may be an example of the mobile device 105 of FIG. 1 or 2. The architecture 300 of the device 105-b may include an application connectivity engine 310. The connectivity engine 310 may manage when an application executing in an application layer 305 on the device 105-b may access a network, such as the network 115 of FIG. 1. The application layer 305 may include applications that execute to provide various functions and communicate with outside networks, such as the network 115, using one or more of radios 330-a of a radio unit 325.

Employing the techniques and structures disclosed herein, the mobile device 105-b may employ a software layer (for illustrative purposes, called a wrapper 315) which provides an application program interface (API) to capture system calls or socket calls from applications and hold them from reaching an OS 220-a. In one configuration, the application connectivity engine 310 may execute the wrapper 315. In one example, the wrapper 315 may intercept a request (e.g., system call, socket call, etc.) for network access originating from an application in the application layer 305. In one embodiment, the wrapper 315 may include the intercepting module 205 of FIG. 2. The wrapper 315 may delay the request from reaching the OS 220-a executing on the device 105-b. The OS 220-a may present an activated first wireless interface to the applications. The wrapper 315 may hold the intercepted request in a queue and prevent them from reaching the OS 220-a. The wrapper 315 may aggregate the intercepted request with other requests intercepted from additional applications. The wrapper 315 may hold or delay the requests from reaching a socket layer 320 of the operating system 220-a. When a request for network access reaches the socket layer 320, the process to establish a communication channel using one or more of the radios 330-a may be initiated according to the interface. For example, the first wireless interface may be a cellular interface. When socket calls are released when the cellular interface is active, setup procedures may be initiated to establish a radio connection with a cellular network. The setup procedures may include signaling techniques that reduce the available bandwidth of the cellular network.

The socket layer 320 may process the requests and notify a particular radio to begin the connection setup procedure to establish a connection between the application that initiated the request and the network 115. For example, the socket layer 320 may issue calls (or requests) to establish a binding between a particular application and a radio, for example radio 1 330-*a*-1. Radio 1 330-*a*-1 may begin transmitting signals to the network 115 to begin the connection setup procedure by establishing a control channel, which may be an example of the control channel 110-*a*-1 of FIG. 1.

When the requests are substantially determined to be released to the socket layer 320, the OS 220-*a* may activate a second wireless interface (prior to the requests being released). For example, the OS 220-*a* may include or cause the activation module 210 of FIG. 2 to activate the second wireless interface. The wrapper 315 may include the releasing module 215 of FIG. 2 and upon being notified that the second wireless interface is active, the wrapper 315 may release the intercepted requests to the socket layer 320 of the OS 220-*a*. Data may be transmitted to/from the applications using a second wireless network via the second wireless interface. An example of the second wireless network may include a WLAN.

Thus, the device architecture 300 provides for intercepting requests to access a network while a first wireless interface is active, activating a second wireless interface upon determining to release the requests to the OS 220-*a*, and releasing the requests to the OS 220-*a*. The activation of the second wireless interface may serve to reduce the network signaling on the cellular network that accompanies the release of requests on a cellular interface.

Figure 4:
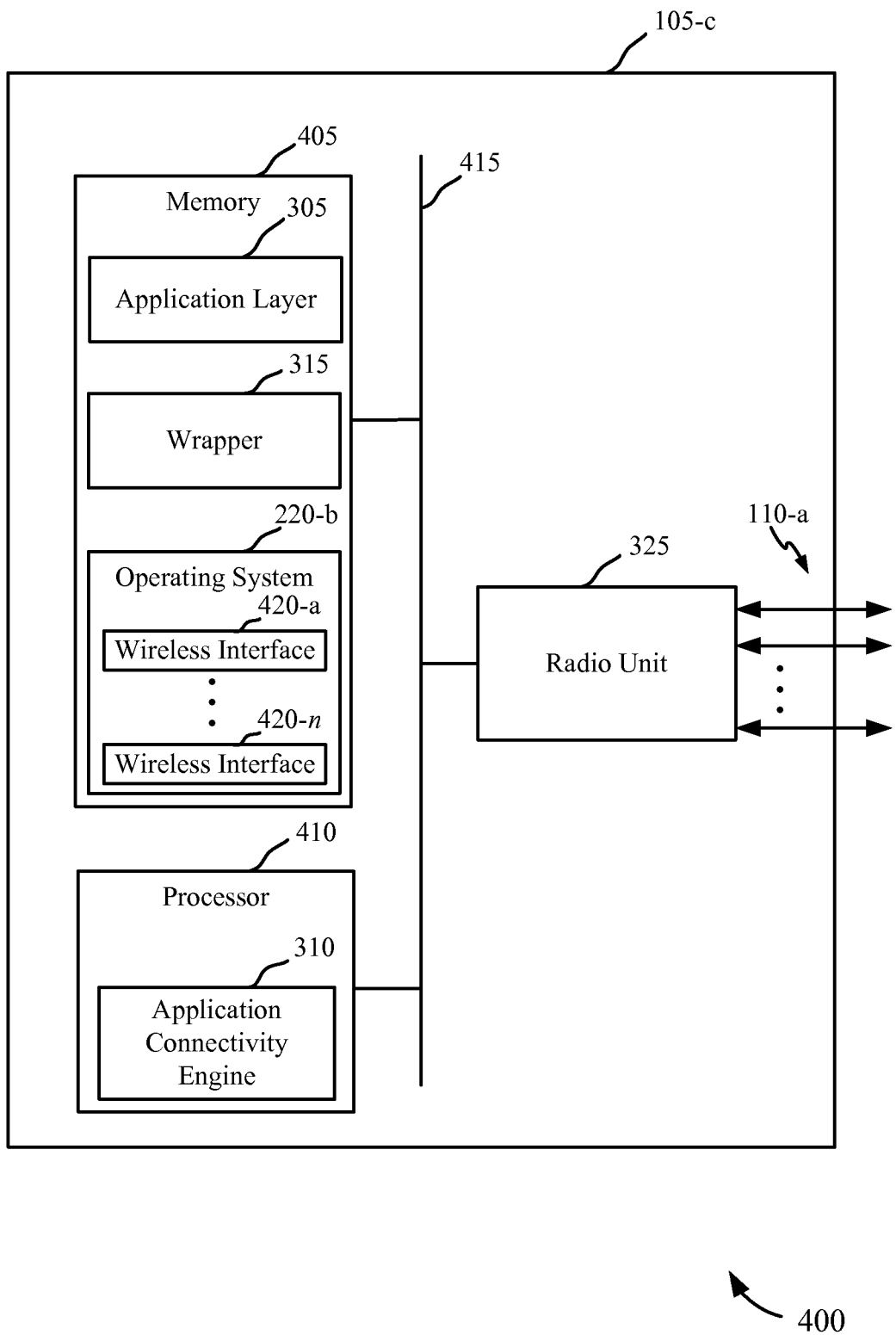
FIG. 4 shows a block diagram of the mobile device implementing the activation of a wireless interface upon determining to release intercepted requests.

FIG. 4 shows a block diagram 400 of a mobile device 105-*c* implementing the activation of a second wireless interface upon determining to release intercepted requests. The device 105-*c* may be an example of the device 105 of FIG. 1, 2, or 3. The device 105-*c* may include memory 405, a processor 410, an application layer 305, a wrapper 315, an application connectivity engine 310, an OS 220-*b*, and a radio unit 325 all coupled to communicate using a communication bus 415. The memory 355 may store the application layer 305, the wrapper 315, and the operating system 220-*b*. The processor 410 may include the application connectivity engine 310. The connectivity engine 310 may be implemented as a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. The connectivity engine 310 may include means for intercepting a socket call from an application on a mobile device while a first wireless interface is active, means for holding the socket call from reaching the socket layer within the OS 220-*b* on the mobile device, means for activating a second wireless interface upon substantially determining to release the socket call, and means for releasing the request to the socket layer within the OS 220-*b*. Further, the connectivity engine 310 may include means for aggregating the socket call with other intercepted socket calls from additional applications installed on the mobile device 105 and releasing the aggregated socket calls in a synchronous manner to the socket layer within the OS 220-*b*. The connectivity engine 310 may also include means for executing the wrapper 315 of FIG. 3 or 4. The executed wrapper may intercept a request from an application. In addition, the engine 310 may include means for identifying the application as a class of application from which socket calls are issued. Further, the connectivity engine 310 may include means for identifying the application as a critical application or a non-critical application, and means for delaying socket calls from non-critical applications until the second wireless interface is activated. It should be noted that the device 105-*c* is just one implementation and that other implementations are possible.

In one aspect, processor 410 includes at least one of a central processing unit (CPU), processor, gate array, hardware logic, memory elements, and/or hardware executing software. The processor 410 operates to control the operation of the device 105-*c* so that system calls for network access initiated by applications executing at the application layer 305 may be held from reaching the OS 220-*b* until a second wireless interface is activated and then released to the OS 220-*b*, or released to a socket layer within the OS 220-*b*. In one implementation, the processor 410 may execute computer-readable instructions related to performing any of a number of functions. For example, the processor 410 may operate to analyze information received or communicated from the device 105-*c* to effectuate the interception of requests and activation of the second wireless interface. In another aspect, the processor 410 may operate to generate information that may be utilized by the memory 405, radio unit 325, application layer 305, the wrapper 315, OS 220-*b*, and/or application connectivity engine 310 to effectuate the activation of a second wireless interface upon determining to release intercepted requests to the OS 220-*b*.

The radio unit 325 may include hardware and/or a processor executing software that may provide a number of radios/interfaces that may be used to interface the device 105-*c* with a number of external entities, such as external communication networks using a number of channels 110-*a*. For instance, radio unit 325 may provide radios/interfaces to communicate using cellular, WLAN, WiFi, Bluetooth, or any other technologies to communicate with communication networks using the channels 110-*a*.

The application layer 305 may include hardware and/or a processor executing software that may store and/or execute one or more applications on the device 105-*c*. In one implementation, the application layer 305 may allow applications to initiate networking function calls to request networking services, such as requesting connection to a radio/interface for the purpose of communicating with an external network or system.

The OS 220-*b* may include a socket layer. The socket layer may include hardware and/or a processor executing software that may perform socket layer functions. In one implementation, the socket layer functions may include such functions as connect( ), bind( ), and setsockopt( ). A connect ( ) function operates to establish a connection between two hosts using a particular radio/interface. For example, the particular radio/interface may be selected from the number of candidate radios provided by the radio unit 325. In one aspect, the socket layer may perform a variety of socket layer functions or commands. The OS 220-*b* may also include a number of wireless interfaces 420-*a* through 420-*n*. As previously described, the OS 220-*b* may activate/deactivate the various interfaces. Data may be transmitted/received from/by the device 105-*c* using at least one of the activated wireless interfaces. Examples of the wireless interfaces may include a cellular interface, a WLAN interface, etc.

The application connectivity engine 310 may include hardware and/or a processor executing software that may execute the wrapper 315 to cause the wrapper to intercept a request for network access from an application executing on the mobile device 105-*c*. The wrapper 315 may also delay the intercepted request from reaching the OS 220-b. The OS 220-b may activate a second wireless interface, such as a WLAN interface, and the wrapper 315 may release the held requests to the OS 220-b.

The connectivity engine 310 may cause the wrapper 315 to capture and hold requests for network access in various ways. The engine 310 may also cause the OS 220-b to activate the second wireless interface upon determining to release the requests. In one example, the engine 310 may cause the activation module 210 of FIG. 2 to perform a scan for an available wireless network, such as a WLAN. Upon detecting an available WLAN, the activation module 210 may cause a radio connection to be established with the WLAN. When the connection is established, the OS 220-b may activate the WLAN interface to present to the applications. The intercepted requests may be released to the OS 220-b. The requests may be released to the socket layer of the OS 220-b. The socket layer may initiate procedures to perform communications across the established radio connection between the applications that originated the requests and a remote device, such as a server, using the WLAN interface.

The memory 405 may include RAM, ROM, EEPROM or any other type of memory device that operates to allow information to be stored and retrieved at the device 105-c. In one implementation, the memory 405 may store computer-readable instructions executed by the processor 410. Memory 405 may also store any of a number of other types of data including data generated by any of the processor 410, radio unit 325, application layer 305, wrapper 315, OS 220-b, and/or application connectivity engine 310. Memory 405 may include a number of different configurations, including as random access memory, battery-backed memory, hard disk, magnetic tape, etc. Various features may also be implemented upon memory 405, such as compression and automatic back up.

In various implementations, the device 105-c may include a computer program product having one or more program instructions ("instructions") or sets of "codes" stored or embodied on a non-transitory computer-readable medium. When the codes are executed by at least one processor, for instance, processor 360 and/or the application connectivity engine 310, their execution may cause the processor 410 and/or the connectivity engine 310 to control the device 105-c to provide the functions of the activation architecture described herein. For example, the non-transitory computer-readable medium may be a floppy disk, CDROM, memory card, FLASH memory device, RAM, ROM, or any other type of memory device or computer-readable medium that interfaces to the device 105-c. In another aspect, the sets of codes may be downloaded into the device 105-c from an external device or communication network resource. The sets of codes, when executed, operate to provide aspects of the system call interception and wireless interface activation architecture described herein.

Figure 5:
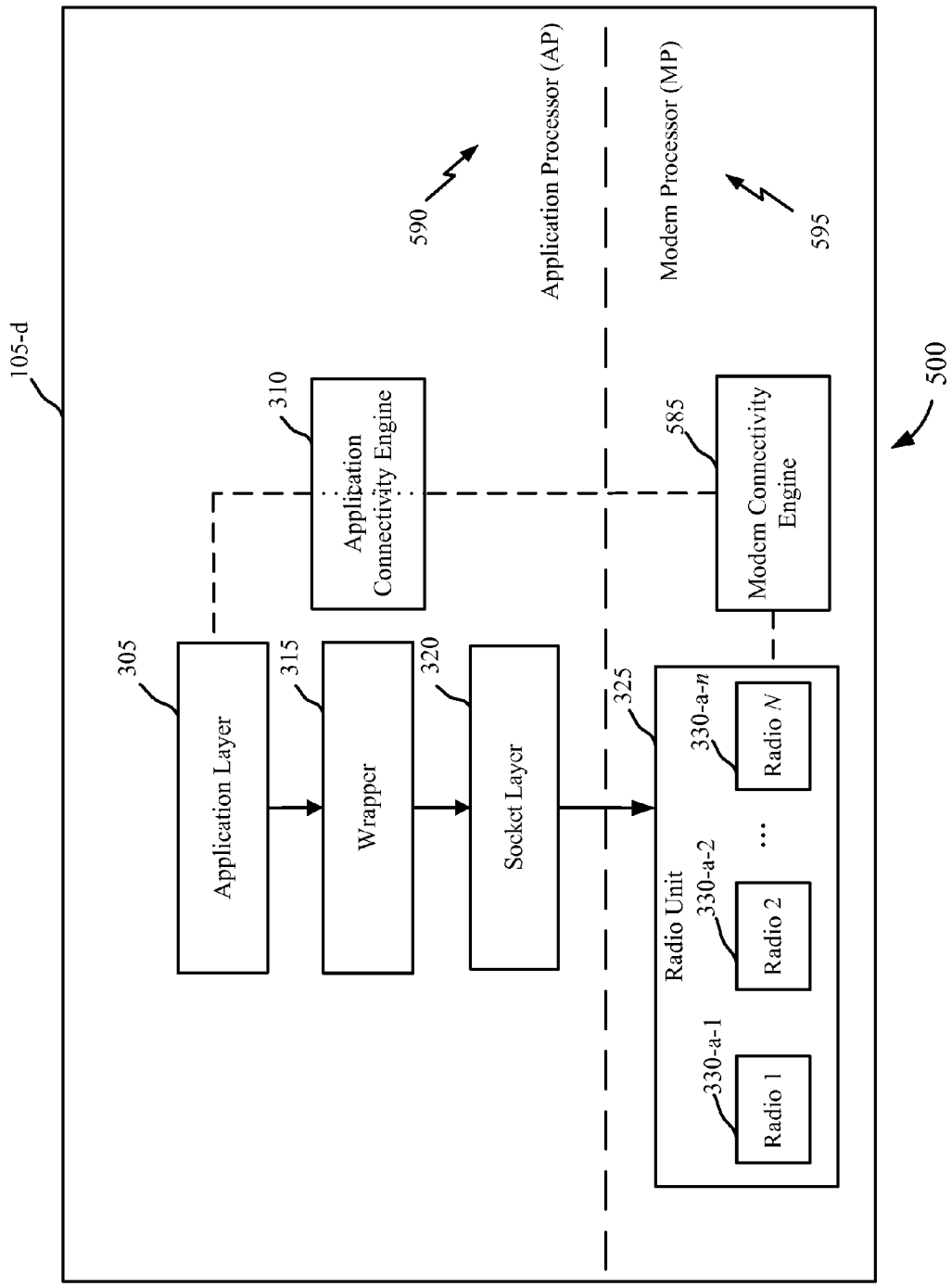
FIG. 5 shows a sample block diagram of an architecture on a mobile device useful for intercepting requests for network access while a first wireless interface is active, and upon determining to release the requests to the operating system, activating a second wireless interface.

FIG. 5 shows a sample block diagram of an architecture 500 on a mobile device 105-d useful for intercepting requests for network access while a first wireless interface is active, and upon determining to release the requests to the OS 220, activating a second wireless interface, as described above. The mobile device 105-d may be an example of the mobile device 105 of FIG. 1, 2, 3, or 4.

As shown, the blocks are divided between an application processor 590 and a modem processor 595, but the various functionality may be organized differently from the example of FIG. 5. An application layer 305 may interact with an application connection engine (App CnE) 310 and a socket layer 320. The application connection engine 310 may communicate with a modem connection engine (Modem CnE) 585. The modem connection engine 585 may manage communication resources, such as a radio unit 325 and the number of radios 330-a therein. A wrapper 315 may be executed in the application processor 590 between the application layer 305 and the socket layer 320 of the OS 220. The wrapper 315 may capture data passed between the application layer 305 and the socket layer 320. For example, the wrapper 315 may be placed between the application layer 305 and the socket layer 320 to intercept socket calls sent from the application layer 305 and intended for the socket layer 320. In one configuration, the wrapper 315 may intercept socket calls from the application layer 305 during a period of inactivity by the device 105-d while a first wireless interface, such as a cellular interface, is active. The wrapper 315 may hold the intercepted calls until a determination is made to release the socket calls to the socket layer 320. Upon determining to release the calls, a second wireless interface may be activated, such as a WLAN interface. The socket calls may trigger a request to establish a communications channel using a radio 330 within the radio unit 325.

In another example, the wrapper 315 may aggregate system calls intercepted from the application layer 305 during a period of inactivity by the device 105-d while the cellular interface is active. The wrapper 315 may hold the intercepted aggregated calls until the WLAN interface is activated. The wrapper 315 may then release the calls to the socket layer 320. Data may be transmitted/received from/by the device 105-d using a radio connection on the WLAN established by the radio unit 325.

In one configuration, the wrapper 315 may be invisible to the applications at the application layer 305 so that the applications are unaware that their requests are being held from reaching the socket layer 320. The wrapper 315 may be a separate software component or may be incorporated into another component such as the application connectivity engine 310 or the OS 220.

Figure 6:
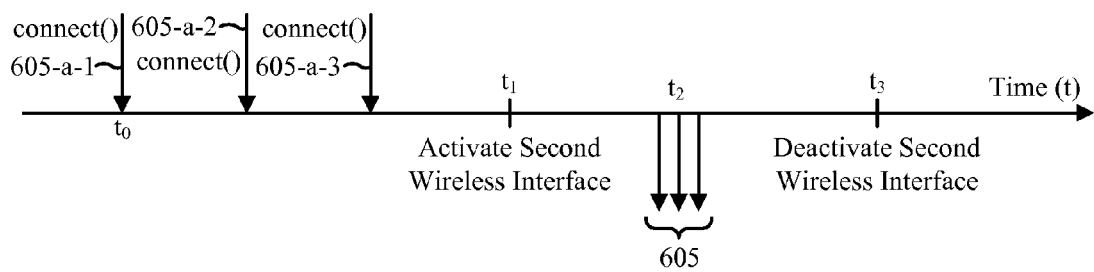
FIG. 6 shows a timing diagram of synchronous releasing of socket calls and enabling of a wireless local area network (WLAN) interface.

FIG. 6 shows a timing diagram 600 of synchronous releasing of socket calls and enabling of a WLAN interface. The applications may be located in the application layer 305 of the mobile device 105. The timing diagram 600 may be the result of the implementation of the application connectivity engine 310 of FIG. 3, 4, or 5. In one configuration, a number of socket calls 605-a may be issued from a number of applications. The socket calls 605-a may be captured and delayed from time $t_0$ while a first wireless interface is active. The interface may be a cellular interface. The socket calls 605-a may be a connect ( ) socket call. In one embodiment, the socket calls 605-a may be held from reaching the OS 220 executing on the mobile device. For example, the socket calls may be held from reaching a TCP/IP stack of the OS 220. The socket calls 605-a may be held up in a queue.

In one example, prior to time $t_1$, a determination may be made that the held socket calls are to be released. At time $t_1$ a second wireless interface may be enabled. The second interface may be a WLAN interface. The interface may be activated upon substantially determining to release the socket calls 605-a. At time $t_2$, the socket calls 605-a may be released to the OS 220, or the calls 605-a may be released to a socket layer within the OS 220. As a result, the mobile device 105 may perform the socket call operations on the WLAN interface instead of the cellular interface. In one example, at time $t_3$ the second wireless interface may be deactivated. As a result, the radio connection with the WLAN network may be terminated. A mobile device, such as the device 105 of FIG. 1, 2, 3, 4, or 5, in idle mode with an activated WLAN interface, may consume more power than an idle device with an activated cellular interface. For example, the paging cycle for a WLAN interface may be around 100 ms and about 2.5 seconds on the cellular interface. Data transmission, however, is typically more power efficient over the WLAN interface than over the cellular interface. For example, the WLAN interface may use much less power than the cellular interface used to transfer most types of content. Thus, according to the present systems and methods, the WLAN interface may be brought up to carry the release of data and then taken offline to conserve battery power of the device. The WLAN interface may be disabled when the TCP connections are substantially closed or when a connection timer expires. In one embodiment, the cellular interface may continue to appear to be available to applications throughout the steps described above.

Figure 7:
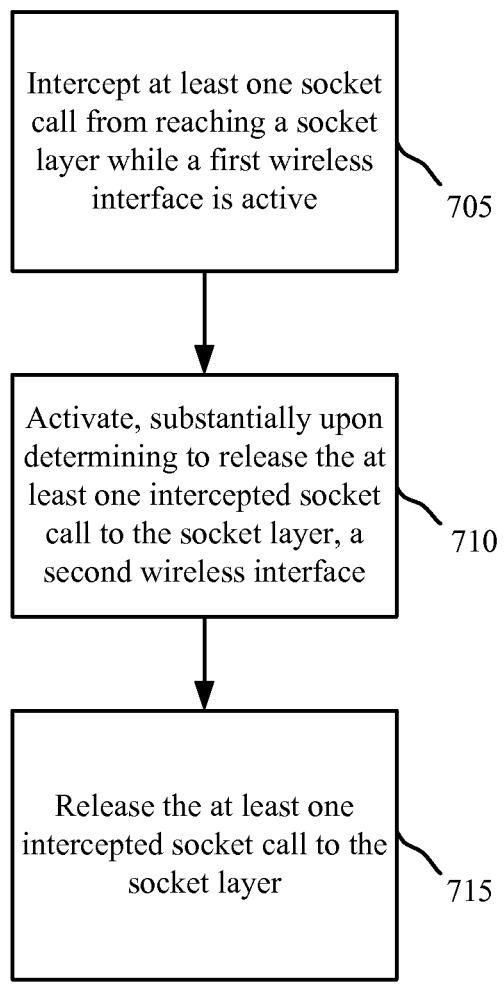
FIG. 7 is a flow chart illustrating one example of a method for incepting and holding requests for network access, and activating a wireless interface when the requests are to be released.

FIG. 7 is a flow chart illustrating one example of a method 700 for incepting and holding requests for network access, and activating a wireless interface when the requests are to be released. For clarity, the method 700 is described below with reference to the mobile device 105 shown in FIGS. 1,2, 3, 4, and 5. In one implementation, the processor 410 and/or the application connectivity engine 310 may execute one or more sets of codes to control the functional elements of the device 105 to perform the functions described below. For example, the application connectivity engine 310 may execute the intercepting module 205, the activating module 210, and the releasing module 215 to perform the various functions described below. In one configuration, the method 700 may be implemented when the device 105 is in an idle mode.

At block 705, at least one socket call may be intercepted from reaching a socket layer while a first wireless interface is active at the OS 220. In one example, the intercepting module 205, that may include the wrapper 315, may intercept the socket call. The socket call may be a request to perform a communication for the mobile device 105, such as establish a communication channel for the mobile device 105. The request may be sent from an application executing at the application layer 305 of the mobile device 105. In one example, the socket call may be a request to initiate a data connection setup procedure to enable the application to interface with an external network, such as the network 115. For example, the socket call may be a system call to the socket layer 320 of the OS 220 on the mobile device 105. The active first wireless interface may be a cellular interface. Socket calls, such as connect( ) socket calls, received by the OS 220, may cause the OS 220 to initiate setup procedures to establish a radio connection on the cellular network.

At block 710, a second wireless interface may be activated at the OS 220 substantially upon determining to release the at least one intercepted socket call to the socket layer within the OS 220. In one configuration, the OS 220 may include the activation module 210. The activation module 210 may determine to release the at least one socket call and may activate the second wireless interface prior to the release of the socket call. The second interface may be a WLAN interface. Activating the second wireless interface may include the activation module 210 scanning signals to determine if a WLAN is available. Upon detecting an available WLAN, a radio connection may be established on the WLAN. For example, the modem connectivity engine 585 may execute one or more sets of code for the radio unit 325 to initiate a radio setup procedure. The procedure may include a radio 330 establishing a radio connection on the WLAN. Upon establishing the radio connection on the WLAN, the activation module 210 may activate the WLAN interface and generate a notification for the applications in the application layer 305 that indicates the WLAN interface is activated.

At block 715, the at least one intercepted socket call may be released. In one embodiment, the releasing module 215 may release the socket call upon receiving the notification that the WLAN interface is activated. The socket call may be released to the socket layer. In one configuration, the releasing module 215 may release the socket call upon the occurrence of a releasing triggering event, as described previously. If a releasing triggering event occurs before the WLAN interface is activated, the releasing module 215 may release the socket call and setup procedures may be initiated to establish a radio connection for the cellular network. In one embodiment, the cellular interface may remain active and visible to the applications.

Thus, the method 700 may provide for intercepting and holding of socket calls issued by applications while a first wireless interface is active on a mobile device 105 in an idle mode. The requests may be held until it is determined to release the requests. A second wireless interface may be activated upon determining to release the requests. As a result, the requests may be released to the socket layer and data may be transmitted/received via the second wireless interface instead of the previously active first wireless interface. It should be noted that the method 700 is just one implementation and that the operations of the method 700 may be rearranged or otherwise modified such that other implementations are possible.

Figure 8:
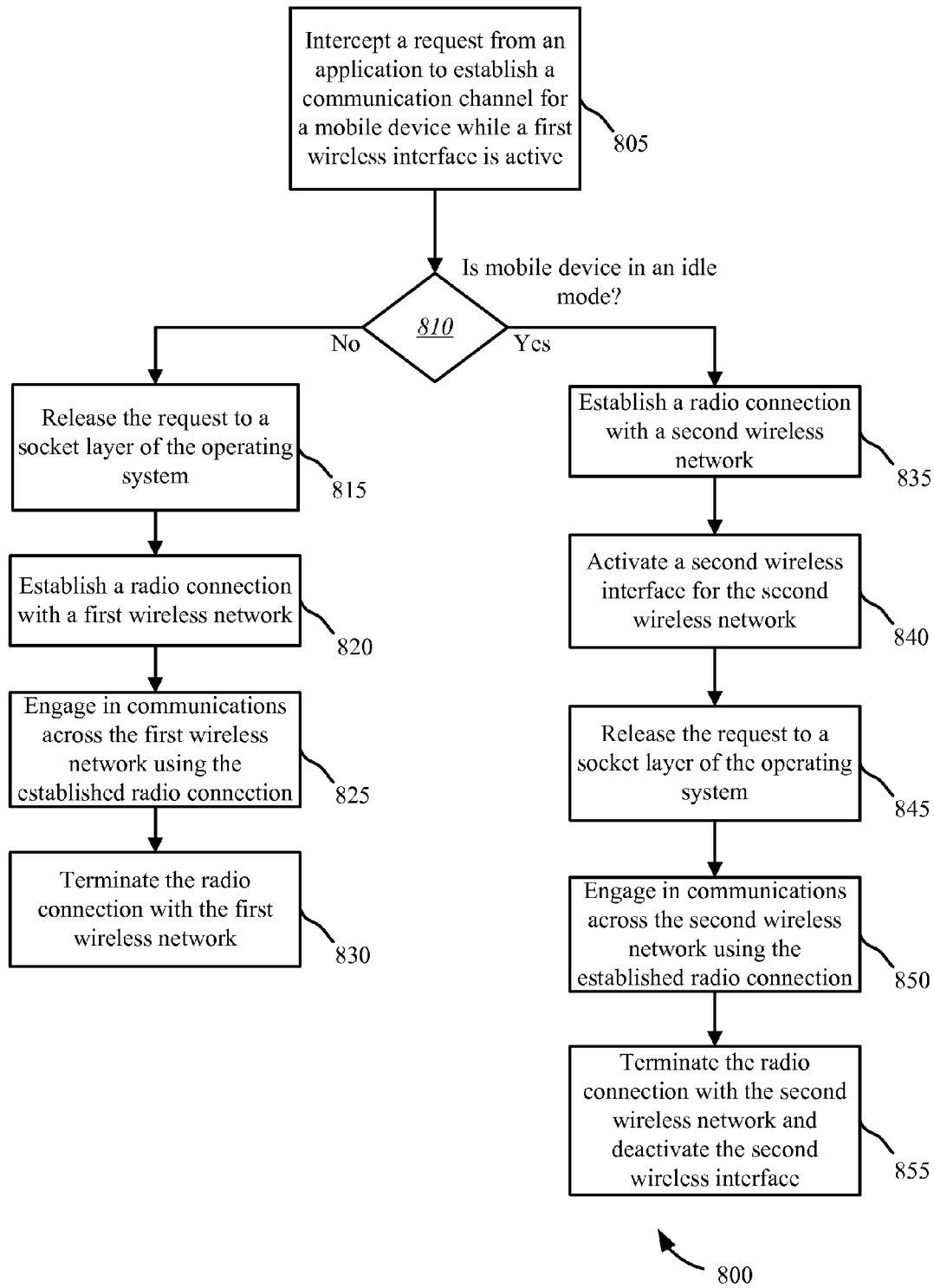
FIG. 8 is a flow chart illustrating one example of a method for intercepting requests for network access and establishing a second wireless interface when a device is in an idle mode.

FIG. 8 is a flow chart illustrating one example of a method 800 for intercepting requests for network access and establishing a second wireless interface when a device 105 is in an idle mode. For clarity, the method 800 is described below with reference to the device 105 shown in FIG. 1, 2, 3, 4, or 5. In one implementation, the processor 360 and/or the application connectivity engine 310 may execute one or more sets of codes to control the functional elements of the device 105 to perform the functions described below. For example, the engine 310 and/or the processor 360 may execute one or more sets of codes execute and control the functions of the intercepting module 205, the activation module 210, and the releasing module 215.

At block 805, a request for network access is intercepted. The request may be sent from an application executing at the application layer 305 of the mobile device 105. In one example, the request may be a request to establish a communication channel with an external network, such as the network 115. The request may be a system call to the socket layer 320 of the OS 220 on the device 105. Upon receiving the request, the socket layer 320 may initiate procedures to establish the communication channel and provide a callback function to the application when the channel is established. The request may be intercepted while a first wireless interface, such as a cellular interface, is available at the OS 220.

At block 810, a determination may be made as to whether the device 105 is in an idle mode. For example, a determination may be made as to whether the device 105 is powered down, in a sleep mode, etc. The device 105 may also be determined to be in an idle mode if, for example, the display of the device 105 is inactive, audio outputs are inactive, etc. If it is determined that the device 105-a is active, at block 815, the request may be released to the socket layer 320 of the OS 220. At block 820, a radio connection may be established with a first wireless network. At block 825, the device 105 may engage in communications across the first wireless network using the established radio connection and the active first wireless interface. At block 830, the radio connection with the first wireless network may be terminated upon substantially concluding the communications across the network. The first wireless interface may be a cellular interface and the first wireless network may be a cellular network.

If, it is determined that the device 105 is in an idle mode, a scan may be performed to determine if a second wireless network is available. At block 835, a radio connection may be established with an available second wireless network. At block 840, a second wireless interface may be activated at the OS 220 for the second wireless network. For example, upon establishing the radio connection, the OS 220 may activate the interface to allow applications executing in the application layer 305 to communicate across the second wireless network. In one embodiment, at block 845, the request may be released to a socket layer 320 of the OS 220. At block 850, the device 105 may engage in communications across the second wireless network via the second wireless interface. The communications may include transmitting/receiving data across the second network using the established radio connection and the second interface. At block 855, the radio connection with the second network may be terminated and the second wireless interface may be deactivated. The radio connection and the second interface may be terminated upon the substantial completion of the socket calls issued from the applications on the second wireless interface.

Thus, the method 800 may provide for intercepting and holding requests for network access and activating a second interface upon determining to release the held requests to the OS 220. By releasing the requests when the second interface is active, communications may execute across the second network via the second interface. Signaling may be minimized by avoiding a number of applications releasing requests to the cellular interface and a number of setup procedures being initiated on the cellular network. It should be noted that the method 800 is just one implementation and that the operations of the method 800 may be rearranged or otherwise modified such that other implementations are possible.

Figure 9:
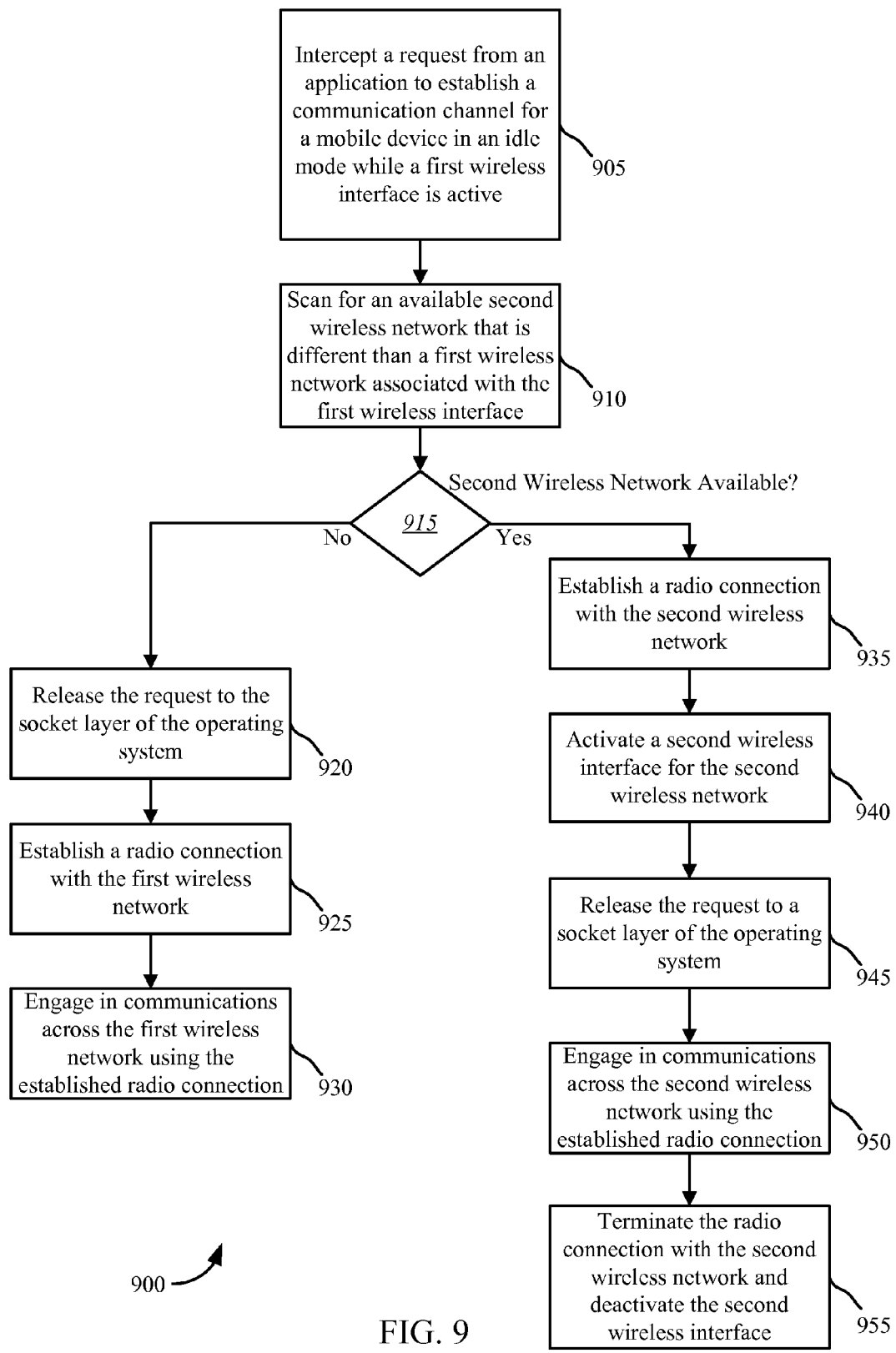
FIG. 9 is a flow chart illustrating one configuration of a method for determining which wireless network to use for communications.

FIG. 9 is a flow chart illustrating one configuration of a method 900 for determining which wireless network to use for communications. For clarity, the method 900 is described below with reference to the device 105 shown in FIG. 1, 2, 3, 4, or 5. In one implementation, the processor 410 and/or the application connectivity engine 310 may execute one or more sets of codes to control the functional elements of the device 105 to perform the functions described below.

At block 905, a request from an application to establish a communication channel for the mobile device 105 may be intercepted. The device 105 may be in an idle mode. In one configuration, a first wireless interface may be active at the OS 220 at the time the request is intercepted. The first wireless interface may be associated with a first wireless network. At block 910, a scan may be performed to locate an available second wireless network that is different than the first wireless network. At block 915, a determination may be made as to whether the second wireless network is available. For example, the second wireless network may be a WLAN or Wi-Fi network. If it is determined that the second wireless network is not available, at block 920, the intercepted request may be released to the socket layer 320 of the OS 220. At block 925, a radio connection may be established with the first wireless network. At block 930, the mobile device 105 may engage in communications across the first wireless network using the established radio connection and the first wireless interface.

At block 915, if it is determined that the second wireless network is available, at block 935, a radio connection may be established with the second wireless network. For example, a radio 330 within the radio unit 325 may establish communications with a radio of a remote device (e.g., server, other mobile device, etc.) to establish a communications channel across the second wireless network. At block 940, a second wireless interface may be activated by the OS 220 for the second wireless network. The interface may allow applications executing on the mobile device 105 to transmit/receive data across the second wireless network via the second wireless interface. At block 945, the request may be released to the socket layer 320 of the OS 220. The request may be released to the socket layer 320. At block 950, the mobile device 105 may engage in communications across the second wireless network using the established radio connection and the second wireless interface. At block 955, the radio connection with the second wireless network may be terminated. The connection may be terminated when the mobile device 105 substantially terminates communications across the network. For example, the connection may be terminated when the socket calls issued from the applications on the device 105 are substantially completed or executed. In addition to terminating the radio connection with the second wireless network, the OS 220 may deactivate the second wireless interface. As a result, the applications installed on the device 105 become aware that the second wireless network is no longer available when the second interface is deactivated.

Thus, the method 900 may provide for scanning for an available WLAN and, if a WLAN is available, releasing socket calls on a WLAN interface. It should be noted that the method 900 is just one implementation and that the operations of the method 900 may be rearranged or otherwise modified such that other implementations are possible.

Figure 10:
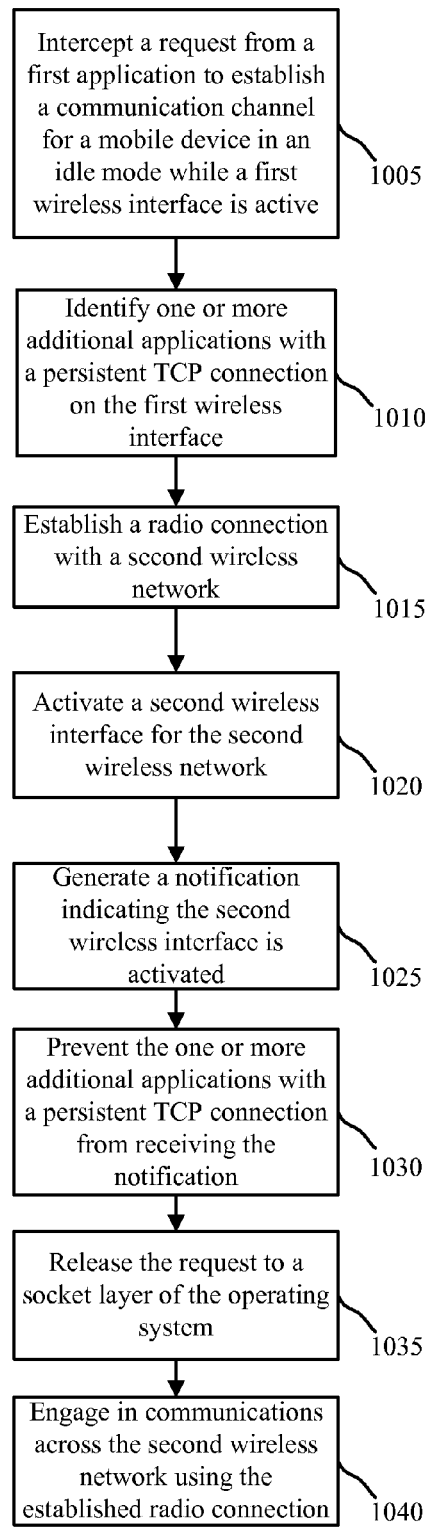
FIG. 10 is a flow chart illustrating one configuration of a method for maintaining persistent Transmission Control Protocol (TCP) connections.

FIG. 10 is a flow chart illustrating one configuration of a method 1000 for maintaining persistent TCP connections. For clarity, the method 1000 is described below with reference to the device 105 shown in FIG. 1, 2, 3, 4, or 5. In one implementation, the processor 410 and/or the application connectivity engine 310 may execute one or more sets of codes to control the functional elements of the device 105 to perform the functions described below.

The method begins at a block 1005, by intercepting a request from a first application. The request may be a socket call to establish a communication channel for the mobile device 105. The device 105 may be in an idle mode and the request may be intercepted while the OS 220 of the device 105 presents an active first wireless interface to the applications. At block 1010, one or more additional applications may be identified that have a persistent (or long-lived) TCP connection on the first wireless interface. For example, applications that provide a presence service may have a TCP connection that is kept open for extended periods of time. An example of such an application that may have a long-lived TCP connection may include Skype®.

At block 1015, a radio connection with a second wireless network may be established. At block 1020, a second wireless interface may be activated by the OS 220 when the radio connection for the second wireless network is established. At block 1025, a notification may be generated indicating that the second wireless interface is activated. The notification may notify applications to use the WLAN interface while it is active. In one example, the OS 220 may generate the notification and may transmit the notification to the first application. At block 1030, the one or more additional applications with the persistent TCP connection may be prevented from receiving the notification. If these applications are notified when a WLAN becomes available, they may close the long-lived TCP connection on the cellular interface and re-register a WLAN IP address with a server. When the WLAN is terminated, these applications may then re-register on the cellular interface. As a result, two connections to the cellular radio may occur. For example, one to close the TCP connection, and one to re-register the applications after the WLAN is terminated. This may increase the level of signaling on the cellular network.

In one embodiment, the application connectivity engine 310 may prevent the one or more applications that have a long-lived TCP connection from receiving the notification by disabling the generation of the notification all together. In another embodiment, applications installed on the mobile device 105 may register with the OS 220 for notifications regarding interfaces being activated and deactivated. The engine 310 may build a list of applications that have a persistent TCP connection on the cellular interface prior to activating the WLAN. The application connectivity engine 310 may deregister these applications from the notification service, or intercept and discard the notification intended for these applications. As another example to prevent the notification from being received by applications with a long-lived TCP connection, the application connectivity engine 310 may discard a connect( ) or other socket calls from these applications while the WLAN interface is active. The engine 310 may also discard system calls from these applications for a certain time period after the WLAN is deactivated. In one embodiment, the engine 310 may execute the wrapper 315 to route write( ) socket calls from these applications to the interface where the TCP connection is established (e.g., the cellular interface). No particular handling may be required. As a result, the applications may not terminate the persistent TCP connection and attempt to register with the WLAN. Applications which have bound their sockets to certain interfaces through bind( ) or by adding a destination based route in a routing table may not be affected by the activation of the WLAN interface.

At block 1035, the request may be released to the socket layer 320 of the OS 220. At block 1040, the mobile device 105 may engage in communications across the second wireless network using the established radio connection and the second wireless interface.

Employing the techniques and structures disclosed herein, socket calls from applications are captured and held them from reaching the OS while a first wireless interface is activated, which may be a cellular interface. The OS may activate a second wireless interface, for example a WLAN interface, and notify the applications that the WLAN is activated. The held system calls or socket calls may be released to the OS or to a socket layer within the OS. Activating the second wireless interface reduces the level of signaling that occurs by applications asynchronously requesting radio connections on the first wireless network (e.g., cellular network) via the first interface.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a number of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

What is claimed is:

1. A method for wireless communication, comprising:
   intercepting at least one socket call from reaching a socket layer of a first wireless interface of a mobile device while the mobile device is in an idle mode and while the first wireless interface of the mobile device is in an activated state and indicated as having an available radio connection and while no radio connections exist on a second wireless interface in a deactivated state, the first wireless interface comprising a cellular interface and the second wireless interface comprising a wireless local area network (WLAN) interface;
   holding the at least one intercepted socket call from reaching the socket layer of the first wireless interface until a determination to release the at least one intercepted socket call;
   upon determining to release the at least one intercepted socket call, scanning for available WLAN networks;
   upon detecting an available WLAN network, activating the second wireless interface;
   upon activating the second wireless interface, establishing a radio connection on the WLAN network via the second wireless interface; and
   releasing the at least one intercepted socket call to a socket layer on the activated second wireless interface;
   wherein determining to release the at least one intercepted socket call comprises detecting the occurrence of a releasing triggering event; and
   wherein the releasing triggering event comprises at least one of an expiry of a timer, a status change of a display, a status change of a microphone, a status change of a speaker, a status change of a global positioning system (GPS) sensor of the mobile device, an indication that a universal serial bus port is in use, an indication that an audio equipment is connected to the mobile device, an indication that a video equipment is connected to the mobile device, a receipt of a maximum number of socket calls, an indication that a Wireless Local Area Network (WLAN) is complete, or any combination thereof.

2. The method of claim 1, further comprising:
   transmitting the released socket call using the activated second wireless interface.

3. The method of claim 1, further comprising:
   deactivating the second wireless interface upon detecting a triggering event.

4. The method of claim 3, wherein detecting the triggering event comprises:
   determining that the at least one socket call has been substantially performed.

5. The method of claim 3, wherein detecting the triggering event comprises:
   determining that a timer has substantially expired.

6. The method of claim 1, further comprising:
   maintaining the first wireless interface in the activated state during a period when the second wireless interface is in an activated state and during a period when the second wireless interface is in the deactivated state.

7. The method of claim 1, further comprising:
   deactivating the first wireless interface, substantially upon determining the second wireless interface is activated; and
   reactivating the first wireless interface, substantially upon determining the second wireless interface is deactivated.

8. The method of claim 1, wherein the releasing triggering event comprises an indication that a connection to a Wireless Local Area Network (WLAN) is complete.

9. The method of claim 1, wherein determining to release the at least one intercepted socket call to the socket layer comprises:
   identifying an application that originated the at least one socket call as a critical application.

10. The method of claim 1, wherein determining to release the at least one intercepted socket call to the socket layer comprises:
    determining that the at least one intercepted socket call possesses a delay tolerance that is below a tolerance threshold.

11. The method of claim 1, further comprising:
    executing instructions for a wrapper, wherein the executed wrapper performs the intercepting of the at least one socket call.

12. The method of claim 11, wherein the wrapper is located between an application layer and the socket layer of an operating system of the mobile device.

13. A mobile device configured for wireless communication, comprising:
    a processor;
    memory in electronic communication with the processor, the memory comprising an operating system;
    the processor comprising an application connectivity engine, the engine configured to execute instructions to:
    intercept at least one socket call from reaching a socket layer of a first wireless interface of a mobile device while the mobile device is in an idle mode and while the first wireless interface of the mobile device is in an activated state and indicated as having an available radio connection and while no radio connections exist on a second wireless interface in a deactivated state, the first wireless interface comprising a cellular interface and the second wireless interface comprising a wireless local area network (WLAN) interface;
    hold the at least one intercepted socket call from reaching the socket layer of the first wireless interface until a determination to release the at least one intercepted socket call;
    upon determining to release the at least one intercepted socket call, scan for available WLAN networks;

upon detecting an available WLAN network, activate the second wireless interface;

upon activating the second wireless interface, establish a radio connection on the WLAN network via the second wireless interface; and release the at least one intercepted socket call to a socket layer on the activated second wireless interface;

wherein determining to release the at least one intercepted socket call comprises detecting the occurrence of a releasing triggering event; and wherein the releasing triggering event comprises at least one of an expiry of a timer, a status change of a display, a status change of a microphone, a status change of a speaker, a status change of a global positioning system (GPS) sensor of the mobile device, an indication that a universal serial bus port is in use, an indication that an audio equipment is connected to the mobile device, an indication that a video equipment is connected to the mobile device, a receipt of a maximum number of socket calls, an indication that a Wireless Local Area Network (WLAN) is complete, or any combination thereof.

14. The mobile device of claim 13, wherein the application connectivity engine is further configured to execute instructions to:

deactivate the second wireless interface upon detecting a triggering event.

15. The mobile device of claim 14, wherein detecting the triggering event comprises the application connectivity engine being further configured to execute instructions to:

determine that the at least one socket call has been substantially performed.

16. The mobile device of claim 14, wherein detecting the triggering event comprises the application connectivity engine being further configured to execute instructions to:

determine that a timer has substantially expired.

17. The mobile device of claim 13, wherein the application connectivity engine is further configured to execute instructions to:

maintain the first wireless interface in the activated state during a period when the second wireless interface is in an activated state and during a period when the second wireless interface is in the deactivated state.

18. The mobile device of claim 13, wherein the application connectivity engine is further configured to execute instructions to:

deactivate the first wireless interface, substantially upon determining the second wireless interface is activated; and reactivate the first wireless interface, substantially upon determining the second wireless interface is deactivated.

19. The mobile device of claim 13, wherein the releasing triggering event comprises at least one of an indication that a connection to a Wireless Local Area Network (WLAN) is complete.

20. The mobile device of claim 13, wherein determining to release the at least one intercepted socket call to the socket layer comprises the application connectivity engine being further configured to execute instructions to:

identify an application that originated the at least one socket call as a critical application.

21. The mobile device of claim 13, wherein determining to release the at least one intercepted socket call to the socket layer comprises the application connectivity engine being further configured to execute instructions to:

determine that the at least one intercepted socket call possesses a delay tolerance that is below a tolerance threshold.

22. The mobile device of claim 13, wherein the memory further comprises:

a wrapper, wherein the application connectivity engine is further configured to execute instructions on the wrapper, wherein when the instructions are executed, the wrapper is configured to intercept the socket call from an application.

23. The mobile device of claim 22, wherein the wrapper is located between an application layer and the socket layer of the operating system of the mobile device.

24. An apparatus configured to manage socket calls from applications on a mobile device, comprising:

means for intercepting at least one socket call from reaching a socket layer of a first wireless interface of a mobile device while the mobile device is in an idle mode and while the first wireless interface of the mobile device is in an activated state and indicated as having an available radio connection and while no radio connections exist on a second wireless interface in a deactivated state, the first wireless interface comprising a cellular interface and the second wireless interface comprising a wireless local area network (WLAN) interface;

means for holding the at least one intercepted socket call from reaching the socket layer of the first wireless interface until a determination to release the at least one intercepted socket call;

means for scanning for available WLAN networks upon determining to release the at least one intercepted socket call;

means for activating the second wireless interface upon detecting an available WLAN network;

means for establishing a radio connection on the WLAN network via the second wireless interface upon activating the second wireless interface; and means for releasing the at least one intercepted socket call to a socket layer on the activated second wireless interface;

wherein determining to release the at least one intercepted socket call comprises detecting the occurrence of a releasing triggering event; and wherein the releasing triggering event comprises at least one of an expiry of a timer, a status change of a display, a status change of a microphone, a status change of a speaker, a status change of a global positioning system (GPS) sensor of the mobile device, an indication that a universal serial bus port is in use, an indication that an audio equipment is connected to the mobile device, an indication that a video equipment is connected to the mobile device, a receipt of a maximum number of socket calls, an indication that a Wireless Local Area Network (WLAN) is complete, or any combination thereof.

25. The apparatus of claim 24, further comprising:

means for deactivating the second wireless interface upon detecting a triggering event.

26. The apparatus of claim 25, wherein detecting the triggering event further comprises:

means for determining that the at least one socket call has been substantially performed.

27. A computer program product configured to manage socket calls from applications on a mobile device, the computer program product comprising a non-transitory computer-readable medium, the medium comprising:

code to intercept at least one socket call from reaching a socket layer of a first wireless interface of a mobile device while the mobile device is in an idle mode and while the first wireless interface of the mobile device is in an activated state and indicated as having an available radio connection and while no radio connections exist on a second wireless interface in a deactivated state, the first wireless interface comprising a cellular interface and the second wireless interface comprising a wireless local area network (WLAN) interface;

code to hold the at least one intercepted socket call from reaching the socket layer of the first wireless interface until a determination to release the at least one intercepted socket call;

code to scan for available WLAN networks upon determining to release the at least one intercepted socket call;

code to activate the second wireless interface upon detecting an available WLAN network; and code to release the at least one intercepted socket call to the socket layer on the activated second wireless interface;

wherein determining to release the at least one intercepted socket call comprises detecting the occurrence of a releasing triggering event; and wherein the releasing triggering event comprises at least one of an expiry of a timer, a status change of a display, a status change of a microphone, a status change of a speaker, a status change of a global positioning system (GPS) sensor of the mobile device, an indication that a universal serial bus port is in use, an indication that an audio equipment is connected to the mobile device, an indication that a video equipment is connected to the mobile device, a receipt of a maximum number of socket calls, an indication that a Wireless Local Area Network (WLAN) is complete, or any combination thereof.

* * * * *